US008763988B2

(12) United States Patent
Dowd et al.

(10) Patent No.: US 8,763,988 B2
(45) Date of Patent: Jul. 1, 2014

(54) WEAR INTERFACE FOR BUTTERFLY VALVE

(75) Inventors: Peter J. Dowd, Granby, CT (US); John M. Dehais, Windsor, CT (US); Blair A. Smith, South Windsor, CT (US); Kevin M. Rankin, Windsor, CT (US); Timothy R. Boysen, Windsor Locks, CT (US); Keith J. Brooky, Wallingford, CT (US); Aaron T. Nardi, East Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 403 days.

(21) Appl. No.: 13/007,811

(22) Filed: Jan. 17, 2011

(65) Prior Publication Data

US 2012/0181467 A1 Jul. 19, 2012

(51) Int. Cl.
*F16K 1/22* (2006.01)
*F16C 17/08* (2006.01)
*F16C 17/04* (2006.01)

(52) U.S. Cl.
USPC ........... 251/305; 251/306; 251/308; 251/304; 384/240; 384/245; 384/912; 384/913

(58) Field of Classification Search
CPC ........ F16C 17/08; F16C 33/12; F16C 33/043; F16C 21/00; Y10S 384/912; F16K 1/22; F16K 27/0218; F16K 1/225; F16K 41/046; D01H 4/12; D01H 7/042; D01H 7/10
USPC .......... 251/304–308; 384/240, 243–245, 912, 384/913
See application file for complete search history.

(56) References Cited

U.S. PATENT DOCUMENTS 1,331,113 A * 2/1920 Lee ................................ 384/245
2,934,312 A * 4/1960 Stevens .......................... 251/283
4,380,246 A   4/1983 Casale et al.
(Continued)

FOREIGN PATENT DOCUMENTS

DE   1550380 A1   9/1969
EP   1371832 A1   12/2003
EP   1852390 A1   11/2007

OTHER PUBLICATIONS

US 7,440,228, 06/2010, Simpson et al. (withdrawn).

(Continued)

*Primary Examiner* — John K Fristoe, Jr.
*Assistant Examiner* — Hailey K Do
(74) *Attorney, Agent, or Firm* — Kinney & Lange, P.A.

(57) ABSTRACT

A butterfly valve comprises a housing including a bore, a rotatable shaft passing through the bore, a disc mounted to the shaft for controlling the flow of a fluid through the bore, a thrust load reacting section and a wear interface. The thrust load reacting section includes a thrust plug assembled in a thrust reacting end of the shaft and a thrust plate secured to the housing. The thrust plate has a well for axially retaining the thrust plug and the thrust reacting end of the shaft. The wear interface includes a first contact region on the thrust plug with a first contact surface and a second contact region at the base of the well with a second contact surface. A portion of the first contact surface is spherical and in contact with a portion of the second contact surface.

15 Claims, 4 Drawing Sheets

(56) References Cited

U.S. PATENT DOCUMENTS

| | | |
|---|---|---|
| 4,441,314 A | 4/1984 | Fitton |
| 4,757,684 A | 7/1988 | Wright |
| 4,768,750 A | 9/1988 | Wilson |
| 5,664,760 A | 9/1997 | Army, Jr. et al. |
| 5,743,512 A | 4/1998 | Greenberg |
| 5,868,502 A * | 2/1999 | Cariveau et al. ............... 384/93 |
| 6,626,421 B2 * | 9/2003 | Torii et al. .................... 251/305 |
| 6,649,682 B1 * | 11/2003 | Breton et al. ................ 524/404 |
| 6,997,438 B2 | 2/2006 | Fauni |
| 7,665,310 B2 | 2/2010 | Laborie |
| 2003/0056836 A1 | 3/2003 | Gagnon |
| 2004/0074537 A1 * | 4/2004 | Roots ........................ 137/487.5 |

OTHER PUBLICATIONS

European Search Report, mailed May 4, 2012.

* cited by examiner

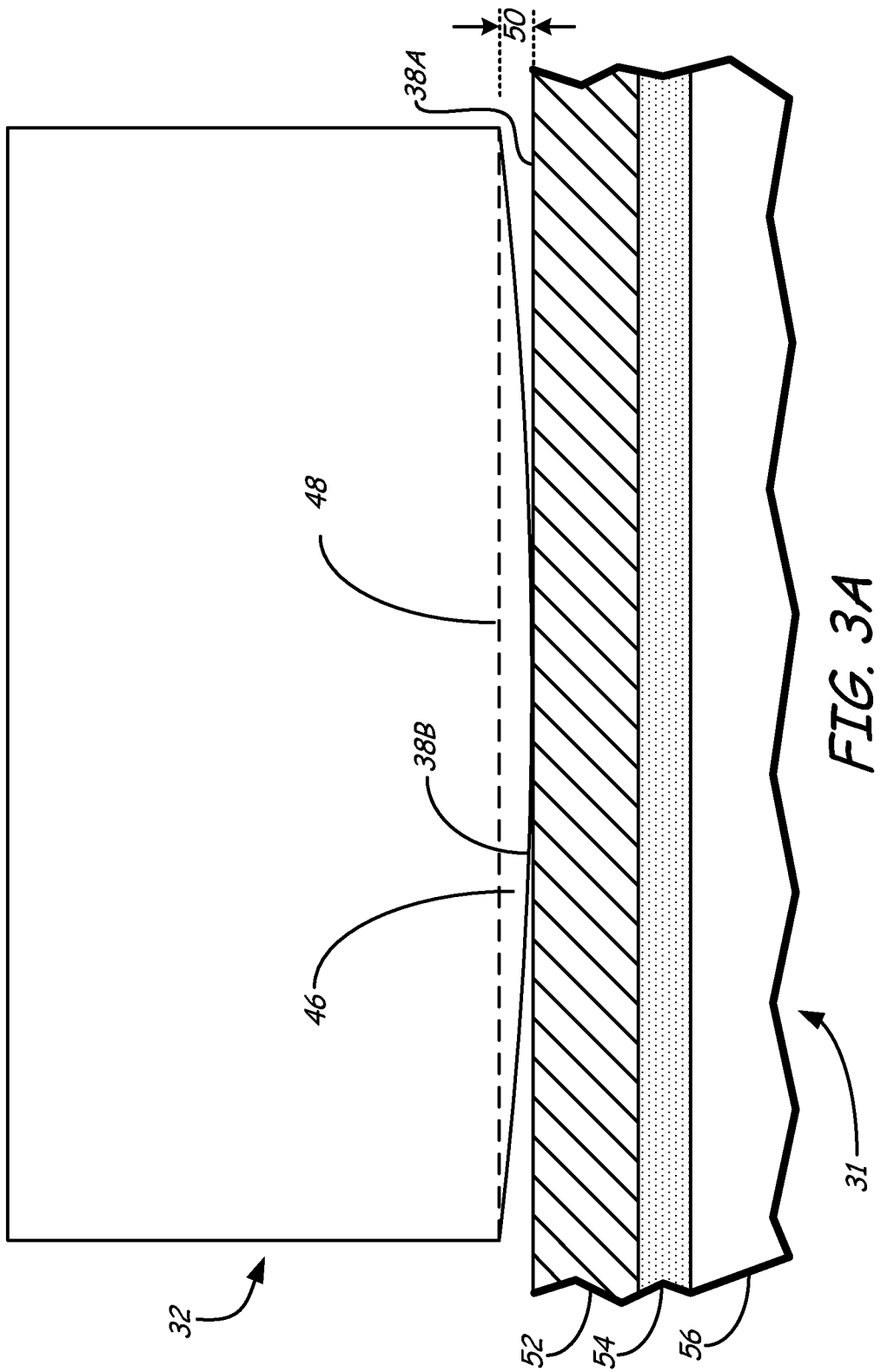

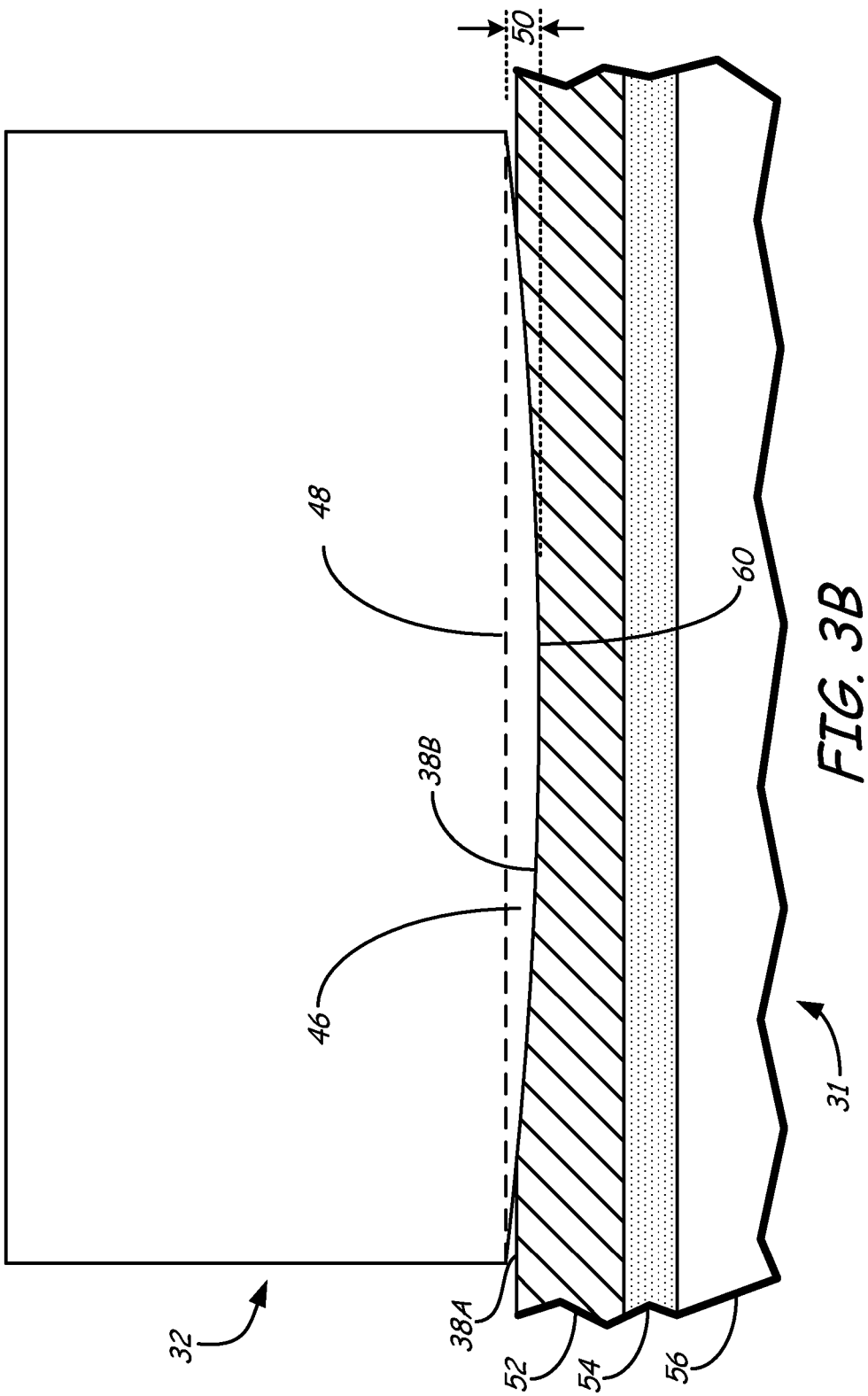

WEAR INTERFACE FOR BUTTERFLY VALVE

BACKGROUND

This invention relates generally to flow control and shutoff valves, and more specifically to butterfly valves.

Butterfly valves control the flow rate of a fluid by rotating a disc or plate within the fluid passage or bore. They are often selected because they are relatively simple to design, customize, and operate, and offer a wide flow control range. Different industries have developed specialized or unique features that are useful for different needs.

Many industries utilize sealing butterfly valves for many critical locations. In some cases, it is necessary to both regulate flow to an area, as well as to completely seal it off. Toward this end, certain valves include a butterfly disc with a sealing element proximate the outer circumference that fits tightly against the walls of the valve bore when the valve is closed, preventing fluid flow past the disc. Some valves may also include canted shafts to improve the sealing ability of the disc. However, these elements increase the force required to control the valve when approaching or leaving the closed position. Increased force can accelerate wear and frictional material loss in the valve, resulting in unseating of the butterfly disc from its position in the valve bore. Unseating of the disc can compromise flow control and lead to permanent binding of the disc or shaft in the bore resulting in valve failure.

SUMMARY

A butterfly valve comprises a housing including a bore, a rotatable shaft passing through the bore, a disc mounted to the shaft for controlling the flow of a fluid through the bore, a thrust load reacting section and a wear interface. The thrust load reacting section includes a thrust plug secured to a thrust reacting end of the shaft and a thrust plate secured to the housing. The thrust plate has a well for retaining the thrust plug and the thrust reacting end of the shaft. The wear interface includes a first contact region on the thrust plug with a first contact surface and a second contact region at the base of the well with a second contact surface. A portion of the first contact surface is spherical and in contact with a portion of the second contact surface.

A wear interface for a pair of components comprises a first component and a second component. The first component has a first contact region, with at least the first spherical contact surface being formed from tungsten carbide in a cobalt binder. The second component has a well with a second contact region disposed therein, with at least the second contact region having a wear resistant coating comprising a nickel alloy matrix. The first component and the second component are configured for substantially continuous frictional contact proximate respective first and second contact surfaces.

An engine nacelle comprises a pressure regulating and shut-off valve. The valve comprises a valve housing including a bore, a rotatable shaft passing through the bore, a disc incorporated with the shaft inside the bore for controlling fluid flow, and a wear interface. The wear interface includes a thrust plug disposed at the thrust reacting shaft end and a thrust plate secured to the housing. The thrust plate has a well for retaining the thrust plug and the thrust reacting shaft end. The thrust plug includes a first tungsten carbide contact region, and the base of the well includes a second wear-resistant contact comprising a plurality of boride and carbide particles dispersed in a nickel alloy matrix.

BRIEF DESCRIPTION OF THE DRAWINGS

FIG. 3A is a cross-section of a wear interface showing the contact surfaces after assembly of the valve.

FIG. 3B is a cross-section of a wear interface showing the contact surfaces after wear-in of the valve.

DETAILED DESCRIPTION

Figure 1A:
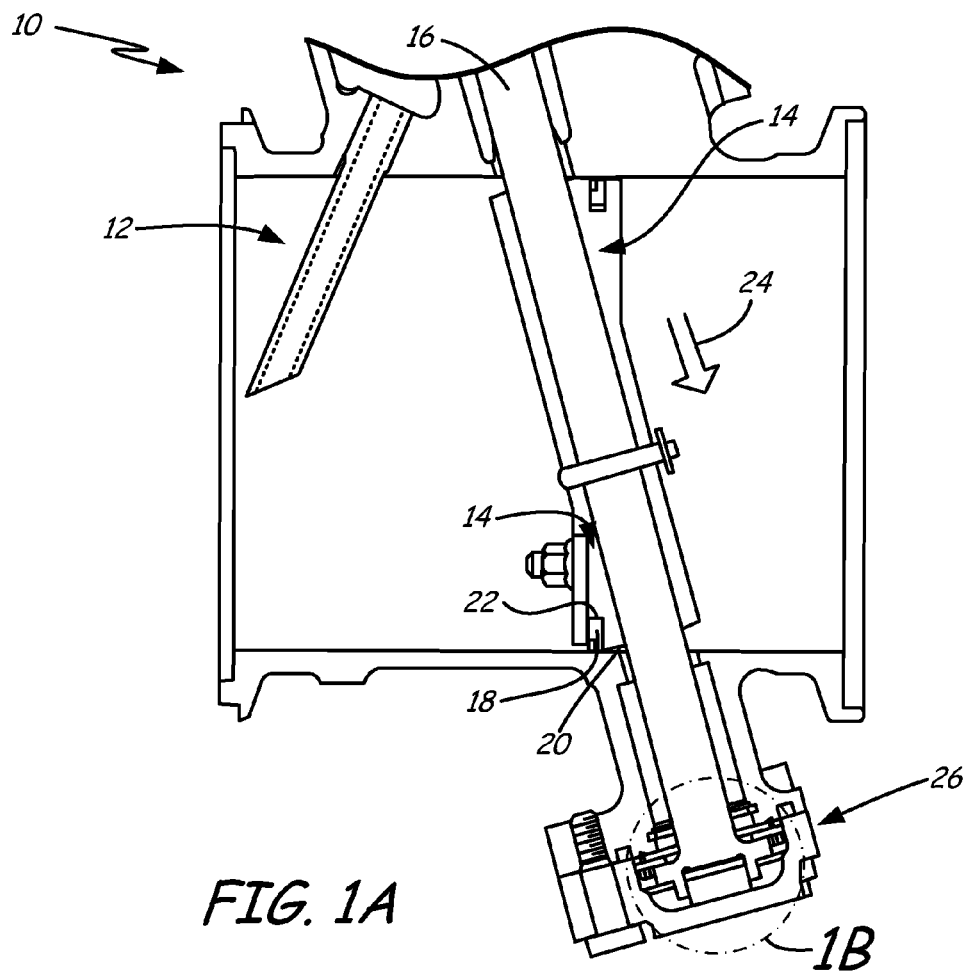
FIG. 1A schematically depicts a side view of a butterfly valve assembly that includes a butterfly disc and a valve shaft with a thrust load reacting section assembly.

FIG. 1A depicts butterfly valve 10 with valve bore 12, butterfly disc 14, valve shaft 16, sealing element 18, gap 20, seal groove 22, thrust load 24, and thrust load reacting section 26. Butterfly valve 10 can be installed in various systems of an aircraft (not shown), or alternatively in a number of other conveyances, as well as in industrial equipment or ground-based HVAC systems. In one example, valve 10 is a pressure regulating and shut-off valve on a nacelle ("NAPRSOV") for a gas turbine engine. Among other uses, the NAPRSOV can be used to regulate bleed air for an engine anti-icing system.

During normal operation of valve 10, fluid flows through valve bore 12 when butterfly disc 14 is in the partially or completely open position. As is known, disc 14 is sized so as to be slightly less than the inner diameter of bore 12. Shaft 16 is operably connected across and through the diameter of butterfly disc 14 and rotated to regulate and shut off flow. Shaft 16 is held in place so as to leave a small substantially annular gap 20 between the inner diameter of bore 12 and the outer circumference of disc 14.

Disc 14 can be formed from various metal alloys including but not limited to titanium, nickel, or iron. The materials for the different components, including bore 12, disc 14, and shaft 16 are selected to be compatible with the fluid being controlled, as well as balancing weight, durability, temperature resistance, and cost. For example, aircraft are operated over a wide variety of conditions, and materials should be selected to minimize the effects of extreme temperatures, operating media, and environmental hazards, while still minimizing weight. Thus, nickel alloys are suitable for many aircraft applications.

Shaft 16 can be rotated manually or with mechanical assistance. Examples include a mechanical crank, a pneumatically or hydraulically actuated crank, and a motorized gear arrangement (not shown) at a control end of shaft 16. The rotational position of shaft 16, and thus disc 14, can be manually or electronically controlled based on flow or valve position feedback data. Shaft 16 can optionally include one or more resilient elements such as springs (not shown) configured to cause valve 10 to default or fail to an open or closed position.

To further restrict flow through valve bore 12 and minimize leakage, disc 14 can also include annular sealing element 18. Seal 18 can be metallic, semi-metallic, or non-metallic. The particular materials are selected for their ability to form a satisfactory seal and to be compatible with the fluid(s) controlled by valve 10. Example non-metallic seals include silicone, natural rubber, or graphite. Graphite seals can form a relatively tight seal, are inert to most aircraft environments, and are self-lubricating.

Sealing element 18 can be one continuous piece, or several smaller pieces to facilitate rapid installation and replacement. In this example, sealing element 18 is a split ring with a scarf cut such that the free diameter of the sealing element 18 is slightly larger than the diameter of the bore 12. Constraining the ring to the diameter of the bore creates a spring force which helps the ring to seal against the bore 12. The example sealing element 18 normally sits freely in groove 22, but forms a seal between disc 14 and the walls of bore 12 by a combination of mechanical and fluid pressure in and around groove 22 when the valve is closed to minimize flow of the operating media through bore 12.

Note that in FIG. 1A, shaft 16 is canted at an angle greater than 90° relative to the centerline of bore 12 to ensure that sealing element 18 seats completely around disc 14. However, in certain embodiments, shaft 16 can alternatively be perpendicular to the inner diameter of bore 12.

Vibration and other forces from fluids pressing against the disc and rotational forces applied at the control end of the shaft contribute to downward thrust loads and can cause eccentric axial motion of the disc and shaft if not sufficiently reacted. In this example, the downward component of these forces is depicted as thrust load 24. Thrust load 24 is transmitted along the length of shaft 16 toward thrust reacting section 26. Load 24 is reacted at the opposing thrust reacting end of shaft 16 to absorb the applied force and limit downward axial movement of shaft 16. It should be noted that there can be upward axial motion as well as downward motion of shaft 16. Upward motion of disc 14 away from section 26 can be managed by other features outside the scope of this disclosure.

Generally in butterfly valves, thrust loads may cause the disc 14 to become displaced eccentrically in the bore due to wear of thrust components. In severe cases, larger control forces are required to overcome the significantly higher friction caused by direct disc-to-bore contact. Depending on the circumstances, the actuating or other control force may not be sufficient to overcome this friction, resulting in the disc temporarily or permanently binding in the bore, causing loss of valve control.

In addition, material wears away from thrust reacting components during regular valve operation. Higher control torques are then required due to increased frictional resistance. By including a new thrust load reacting section 26 with components having optimized contact surfaces and increased resiliency, eccentric displacement of the disc 14 with respect to the bore 12 can be effectively controlled. Wear and maintenance costs are therefore substantially reduced, and the working life of valve 10 is extended.

Figure 1B:
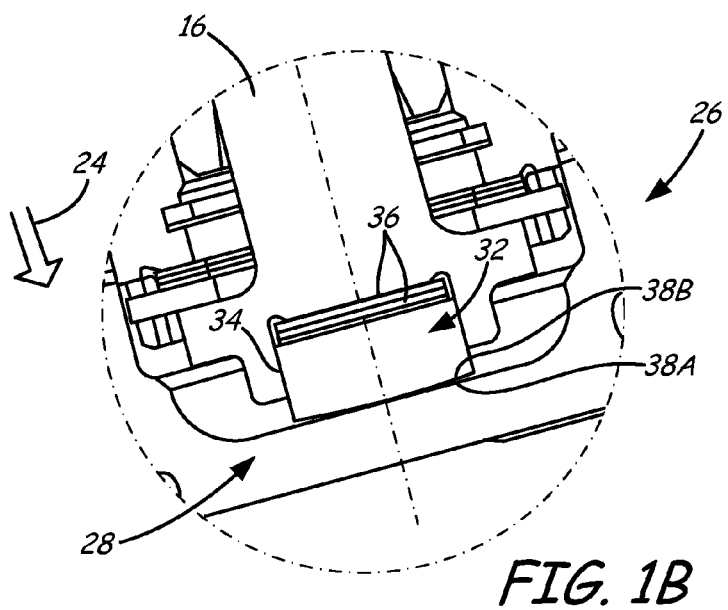
FIG. 1B is a magnified cross-section of the thrust load reacting section assembly shown in FIG. 1A including a wear interface having a thrust plate and a thrust plug.

FIG. 1B shows an enlarged cross-sectional view of thrust load reacting section 26 from FIG. 1A. FIG. 1B includes valve shaft 16, thrust load 24, thrust plate 28, wear interface 30, thrust plug 32, thrust plug cavity 34, shims 36, plate contact surface 38A, plug contact surface 38B, and thrust plate well 40.

Valve 10 (shown in FIG. 1A) has wear interface 30, which includes thrust plate 28 and thrust plug 32. Thrust plate 28 is secured to the housing of valve 10 (shown in FIG. 1A). Thrust plug 32 is held within thrust plug cavity 34 in the lower thrust reacting end of shaft 16, opposite the upper control end of shaft 16. Thrust plug 32 sits within thrust plate well 40. Thrust plate 28 and thrust plug 32 each have respective contact surfaces 38A, 38B as part of contact regions discussed with respect to FIGS. 2A and 2B.

As was shown in FIG. 1A, when valve 10 is commanded to change position, torque is applied to the control end of shaft 16 to rotate disc 14. Thrust load 24 results primarily from pressure differentials in the flow path and may be directed downward toward thrust load reacting section 26. In this example, thrust load 24 is reacted with thrust plug 32 being pressed toward plate 28 as shaft 16 rotates. This causes frictional resistance to the control torque as well as wear of contact surfaces 38A, 38B.

During normal operation, shims 36 and thrust plug 32 are held in cavity 34 of shaft 16 by thrust plate 28, limiting downward axial movement of shaft 16. In one example, shims 36 and thrust plug 32 are placed into thrust plug cavity 34 before thrust plate 28 is secured to the valve housing. Shims 36 and thrust plug 32 have diameters that are slightly less than the diameter of cavity 34. Their total thicknesses are selected so as to position disc 14 concentrically within bore 12 during assembly and ensure a uniform gap 20 between disc 14 and bore 12 (shown in FIG. 1A). Thrust plate 28 and thrust plug 32 are in contact inside well 40 at respective surfaces 38A, 38B. Details of thrust plate 24, thrust plug 32, and shims 36 are explained relative to FIGS. 2A-2B.

In past butterfly valves, high thrust loads and the contact stresses in and around the thrust load reacting section accelerate wear around the different contact surfaces and around the disc. In addition, when the valve is at or near the closed position, the thrust load is typically higher due to greater pressure differential across the disc. The obtuse angle of a canted shaft also increases the thrust load along the shaft due to the force vector of the canted shaft 16 being offset from the diameter of disc 14, as well as the geometry of the disc 14. Each of these factors, can accelerate wear around components of the thrust reacting section. As material around the thrust reaction section wears, the shaft and disc assembly tend to move downward as well, reducing the clearance between the disc and the bottom of the bore. In cases of severe thrust wear, the disc can contact the bore causing a significant increase in friction. This increases the torque required to turn the shaft. Eventually, control forces cannot overcome valve friction, resulting in binding.

Components of wear interface 30 work together to minimize wear, alleviating many of the issues in previous valves to improve performance and the useful life of valve 10. In one example embodiment, include compatible geometries, materials, coatings, and surface finishes that positively interact to substantially improve life and performance of the valve. Example components are illustrated and described below.

Figure 2A:
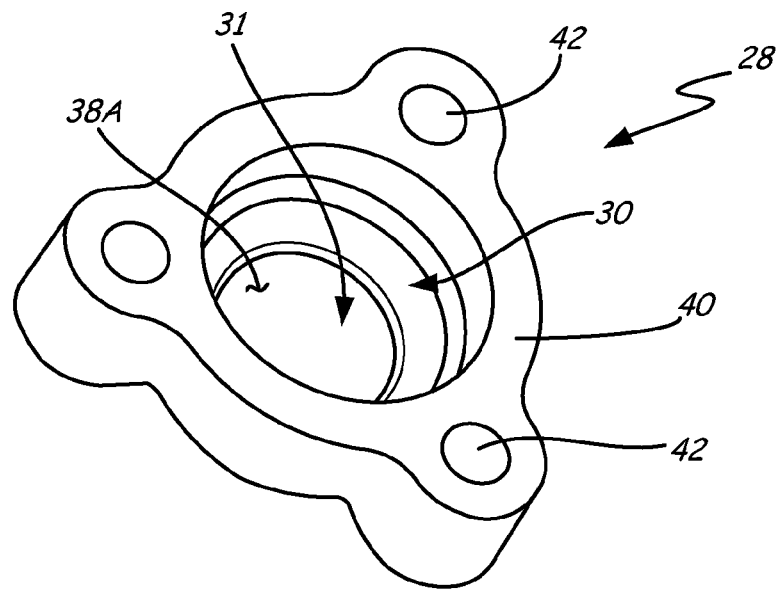
FIG. 2A shows a perspective view of a hard-coated thrust plate with a well for retaining a thrust plug.

FIG. 2A is a perspective view of thrust plate 28. Thrust plate 28 includes plate contact region 31, plate contact surface 38A, thrust plug well 40, and through holes 42. In this example, plate 28 has a substantially round body with thrust plug well 40 in the center. As was seen in FIGS. 1A and 1B, one end of shaft 16, including thrust plug 32, engages with thrust plate 28. In this example, plate 28 receives and axially retains plug 32 (not shown in FIG. 2A) within well 40. When first manufactured, well 40 can include plate contact region 31 with substantially flat contact surface 38A at the base of well 40. As noted above, thrust plate 28 is secured to the housing of valve 10. In this example, plate 28 is secured to the valve housing (shown in FIG. 1A) by bolts via through holes 42.

Plate contact surface 38A can interact with the base of thrust plug 32 (plug contact surface 38B shown in FIG. 2B) to manage and control wear caused by thrust load 24 and rotational motion of thrust plug 32 relative to thrust plate 28. Plate contact region 31 can be fabricated to include a hardface coating layer with flat plate contact surface 38A. During wear-in of valve 10, a spherical recess can form in the coating layer for seating thrust plug 32, increasing overall contact area and spreading contact stresses over larger portions of surfaces 38A, 38B. This is shown and discussed in detail with respect to FIGS. 3A and 3B.

Well 40 can be machined such as by counterboring, out of a blank of austenitic stainless steel. Alternatively, blanks, castings, or forgings of steel, aluminum, or titanium can be used for thrust plate 28. Selection of a particular material for thrust plate 28 should take into consideration compatibility with processes for applying and retaining any coatings, as described with respect to FIGS. 3A and 3B.

Figure 2B:
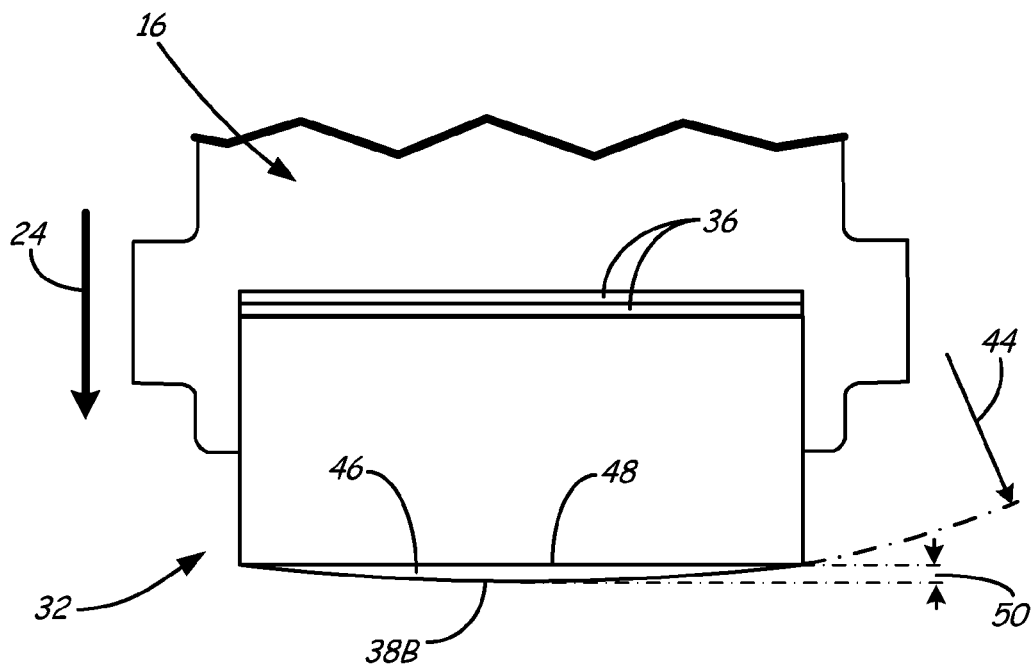
FIG. 2B is a cross-section of the lower thrust reacting section of the shaft including a thrust plug.

FIG. 2B shows a cross-section of thrust plug 32 disposed at the thrust reacting end of shaft 16. FIG. 2B includes a portion of shaft 16, thrust plug 32, thrust plug cavity 34, plug contact surface 38B, spherical radius 44, plug contact region 46, spherical chord 48, and chord height 50.

Plug 32, held at the thrust reacting end of shaft 16 includes plug contact region 46 with contact surface 38B. Plug contact surface 38B includes substantially spherical radius 44 to minimize wear caused by interaction with contact surface 38A on thrust plate 28 (shown in FIG. 2A). As is well known, a spherical radius is the radial dimension of a hypothetical sphere that would encompass a spherical surface. For example, valve 10 having a nominal size of about 3.0 inches (about 76 mm) is installed into an engine nacelle. In certain embodiments, spherical radius 44 is between about 2.5 inches (about 63 mm) and about 5.0 inches (about 127 mm). In certain of those embodiments, radius 44 is between about 3.0 inches (about 76 mm) and about 4.0 inches (about 102 mm). In yet certain of those embodiments, radius 44 is about 3.5 inches (about 88 mm).

The nominal magnitude of radius 44 should generally increase faster than the nominal diameter of the valve. This is the result of an exponential relationship between the diameter of disc 14 (shown in FIG. 1A) and the magnitude of downward thrust load 24, which controls the resulting contact stresses on contact surfaces 38A, 38B. However, other factors can increase or decrease the magnitude of thrust load 24 and thus indicate use of a correspondingly larger or smaller spherical radius 44. One consideration is the ability of thrust plug 32 to self-align against the flat contact surface 38A in well 40 when the valve is put into service. As will be described and shown with respect to FIGS. 3A and 3B, valves with thrust plate 28 and thrust plug 32 can be self-aligning, which reduces cost by improving ease of manufacturing. A larger radius 44 can potentially cause plug 32 to seat on edge due to angular tolerance stackup, resulting in high contact stress and high wear rate. Similarly, a smaller radius 44 can concentrate forces over an insufficient area and wear too quickly through coating layer 52, causing premature binding of the valve 10 due to too much downward travel of the shaft 16 and disc 14 toward the inner diameter of the bore 12 (shown in FIG. 1A).

Thrust plug 32 is constructed from material with higher hardness than shaft 16 in order to decrease frictional wear in contact region 46. In certain embodiments, plug 32 can be formed by sintering a tungsten carbide powder with either a nickel or cobalt binder. In certain of those embodiments, the binder is cobalt and accounts for a total of between about 5.0 wt % and about 6.5 wt % of plug 32, while niobium and titanium concentrations are limited to no more than about 0.5 wt %, and tantalum content is limited to less than about 2.2 wt %.

In these example embodiments, plug 32, including plug contact region 46, has a minimum Rockwell "A" hardness of at least about 91.8, helping plug 32 to withstand contact stresses with plug contact surface 38A. In this example, plug 32 is made entirely using the same material as plug contact region 46. Alternatively, the harder contact material can be limited to region 46 with the remainder of plug 32 optionally being formed from less expensive or lighter materials.

Shims 36 are also disposed in thrust plug cavity 34 and have several purposes, three examples of which are described here. First, they ensure that plug 32 is axially positioned both in thrust plug cavity 34 and relative to other wear components. Second, shims 36 are selected to have surfaces and dimensions such that they restrict rotation of plug 32 relative to shaft 16. In other words, when torque is applied to shaft 16, thrust plug 32 and shims 36 rotate along with shaft 16 relative to thrust plate 28 (shown in FIG. 2A). Finally, they allow for adjustment of disc 14 position during assembly to ensure concentricity within the bore 12 (e.g., gap 20) shown in FIG. 1A. Wear-in is discussed further with respect to FIGS. 3A-3B.

FIG. 3A is a magnified cross-section of a portion of the wear interface shown just after assembly of the valve. FIG. 3A includes thrust plate 28, plate contact region 31, thrust plug 32, contact surfaces 38A, 38B, thrust plug well 40, plug contact region 46, spherical chord 48, spherical chord height 50, hardface coating layer 52, diffused bond layer 54, and substrate 56.

As can be seen in FIG. 3A, the initial contact area of wear interface 30 comprises only a relatively small fraction of spherical surface 38B is in contact with flat surface 38A when the valve is first assembled. The components of the valve are assembled such that the wear interface 30 is not preloaded. The thrust plate 28 is installed in sufficient proximity to hold thrust plug 32 in place, as was shown in FIG. 1B.

This combination of large-radius spherical plug contact surface 38B and initially flat plate contact surface 38A minimizes the axial shaft 16 displacement and the resulting disc eccentricity during wear-in to full plug diameter contact, at which time the stress, and hence the wear rate, is minimized. However, if the radius is made too large, then angular tolerance stack-up may cause the thrust plug to seat on edge, resulting in high contact stress and increased wear rate. The configuration also permits self-alignment by controlled wear of coating layer 52 as will be described relative to FIG. 3B below.

Plug contact region 46 can be bounded by spherical chord 48 and has an effective maximum spherical chord height 50. Height 50 is a vertical distance between the center point of spherical plug contact surface 38B and chord 48 extending across the top of plug contact region 31. Spherical chord height 50 effectively determines the axial displacement of the shaft during the wear-in up to full plug diameter contact described relative to FIG. 3B.

Like thrust plug 32, materials for thrust plate 28 can be selected to facilitate controlled wearing in of contact regions 31 and 46 while still minimizing wear during normal operation. As noted above, plate contact region 31 can include hardface coating layer 52. One suitable class of coating for layer 52 is nickel-based, which offers a sufficient degree of hardness and wear resistance. Such coatings will also wear preferentially, but not too quickly, over the harder tungsten carbide that can be used in thrust plug contact region 46. This is useful for self-alignment of contact surfaces 38A, 38B as shown in FIG. 3B.

Coating layer 52 can be applied so as to have a fine microstructure that is resistant to abrasion. For example, in certain embodiments, coatings having a plurality of boride and/or carbide particles dispersed throughout an alloy matrix offer good resilience and abrasion resistance. Many such materials are suitable for coating layer 52 when the valve is used in normal ambient atmospheric conditions. The alloy matrix can be nickel-based, cobalt-based, or iron-based. To ensure sufficient strength of coating layer 52, it will have a minimum Rockwell "C" hardness of at least about 50.

In certain of those embodiments, coating layer 52 includes both boride and carbide particles dispersed in a nickel-based alloy matrix. In yet certain of those embodiments, the boride and carbide particles in the nickel alloy matrix are primarily chromium borides and chromium carbides. This results in high hardness and abrasion resistance, even in corrosive environments, such as those containing salt sprays and deicing chemicals. To promote formation of these chromium boride and carbide particles, the composition of the material for coating layer 52 can include between about 0.3 wt % to about 1.0 wt % carbon, between about 3.5 wt % and about 5.5 wt % silicon, between about 3.5 wt % and about 5.5 wt % iron, between about 2.5 wt % and about 4.5 wt % boron, between about 12.0 wt % and about 18.0 wt % chromium, no more than about 1.0 wt % cobalt, with the balance nickel. Such embodiments of coating layer 52 can include a minimum Rockwell "C" hardness of at least about 55. One example material meeting these composition ranges is Colmonoy® 6.

Hardface coating layer 52 can be applied to contact region 31 in well 40 (shown in FIG. 2A) using any number of methods that result in the above described properties. Example methods include puddle melting, spray welding, or brazing. Coating layer 52 can be formed according to traditional binder-assisted brazing techniques or more recently developed processes that do not require a separate binder material. Examples of a brazing process that does not require a separate binder material are disclosed in U.S. patent application Ser. No. 12/940,558 assigned to the same entity, the entirety of which is herein incorporated by reference.

In this example, the coating material is applied as a powder into well 40 (shown in FIG. 2A). Thrust plate 28 and the powder are then heated in an oven for a time and temperature sufficient to melt the powder. In this example, interdiffusion occurs between the molten hardface alloy and substrate 56, forming diffused bond layer 54. As noted above, selection of substrate 56, which is the base material for thrust plate 28 (shown in FIG. 2A), must also take into account the diffusion and adhesion properties of coating layer 52. In this example where coating layer 52 has a composition and microstructure similar to Colmonoy® 6 as described above, substrate 56 can be most grades of austenitic stainless steel, such as Nitronic® 60.

Initial applied thickness of coating layer 52 can be based on several considerations. Coating layer 52 should be thicker in the case of valves subject to higher thrust loads, such as those with larger nominal bore sizes and higher pressure differentials across disc 14. The thickness of coating layer 52 should account for a small degree of accelerated wear until the valve is "broken in" or worn in. However, thicker coatings may be more difficult to apply, or increase the risk of cracking and/or spalling of the coating layer 52. The applied thickness of coating layer 52 is related to spherical chord height 50 because height 50 is an approximation of the "break-in" depth of wear. Applied thicknesses of coating layer 52 should thus account for the wear-in period to ensure an adequate thickness after wear-in, with examples shown and described relative to FIG. 3B.

Excessive wear can be additionally be controlled by finishing contact surfaces 38A, 38B to a specified maximum roughness. In certain embodiments, contact surfaces 38A, 38B are both finished to maximum roughness of RA 32. In certain of those embodiments, contact surfaces 38A, 38B are finished to maximum roughness of RA 16. In yet certain other embodiments, plate contact surface 38A is finished to a maximum roughness of RA 8. Limiting the maximum roughness of surfaces 38A and 38B reduces asperity heights, which reduces friction and contact stress, and slows abrasive wear. This is particularly important for the thrust plug contact surface 38B, since the thrust plug is constructed from a harder material and will tend to preferentially abrade surface 38A. Surfaces 38A, 38B can be finished to even lower roughness values than those listed above but processing time and cost increase significantly as roughness is further reduced.

FIG. 3B is a magnified cross-section of a portion of wear interface 30 shown after wear-in of the valve. FIG. 3B includes thrust plate 28, plate contact region 31, thrust plug 32, contact surfaces 38A, 38B, thrust plug well 40, plug contact region 46, spherical chord 48, spherical chord height 50, hardface coating layer 52, diffused bond layer 54, substrate 56, and plug seat 60.

When the valve is first assembled (shown in FIG. 3A), contact regions around surfaces 38A and 38B can wear relatively quickly. However, in this example, wear is controlled due in part to the relative shapes, hardness, and surface textures of the contact surfaces to allow the valve to wear in during initial operation, allowing the contact stresses to be spread over a larger area, specifically plug seat 60. As noted above, tungsten carbide is substantially harder and wear-resistant than coating layer 52, which can include Colmonoy® 6 or similar materials as described above. With initial contact stresses on the order of several thousand pounds per square inch (psi) concentrated near the center of flat contact surface 38A, coating layer 52 begins to wear away, leading to formation of plug seat 60.

As spherical plug seat 60 begins to take shape in coating layer 52, surface area increases, thus offering more area over which to distribute the thrust load. Eventually plug seat 60 becomes a substantially spherical recess complementing a substantial portion of spherical contact surface 38B, and greatly increasing the overall contact area between plate 28 and plug 32. Once wear-in is substantially complete, the magnitude of stress between contact surface 38B on plug 32 and plug seat 60 at plate contact region 31 can be reduced, in many cases to well below 1000 psi (6.9 MPa). Selection of compatible geometries, materials, and coatings allows the valve to withstand contact stresses of this magnitude with minimal material loss, and minimal depth of wear, after the initial wear-in period, helping to extend the life of the valve and increase maintenance intervals. Suitable application and materials for coating layer 52 are described above with respect to FIG. 3A.

After the valve is worn in, coating layer 52 is still worn away through normal valve operation, albeit at a much slower rate. Thrust plug 32 also experiences a smaller degree of wear, but the majority of material loss occurs in coating layer 52 in this example due to the fact that tungsten carbide is harder and more resistant to wear than the alloys discussed above for coating layer 52. During both wear-in and normal operation, material loss causes plug 32 to gradually migrate downward as shown in FIG. 3B. As shown in FIGS. 1A and 1B, downward migration of plug 32 can lead to downward movement of shaft 16 and disc 14 toward the lower end of bore 12 upon application of thrust load 24. Thus it is helpful to minimize the depth of wear in coating layer 52 to slow the downward migration of thrust plug 32.

Returning momentarily to FIG. 1A, gap 20 is the clearance between disc 14 and the inner diameter of bore 12. Generally, but not uniformly, it is desirable to minimize gap 20 to better control flow and reduce leakage past disc 14. By reducing the rate at which coating layer 52 wears away during normal operation, gap 20 can be smaller relative to the clearance of other butterfly valves with less resilient wear interfaces.

Since, after the wear-in period, plug seat 60 has a depth approximating spherical chord height 50, coating layer 52 should be applied to contact region 31 with a minimum thickness greater than chord height 50. In this example, height 50 is about 0.005 inches (about 127 µm). If plug 32 wears through coating layer 52 and reaches diffused bond layer 54 or substrate 56, the rate of wear and potential for damage quickly accelerates. Therefore, it will be helpful in certain embodiments for the applied thickness of coating layer 52 to be greater than the height of gap 20 so that thrust plate 28 retains the ability to react thrust loads even as coating layer 52 wears down. In certain embodiments, height 50 is between about 40% and about 55% of the height of gap 20 in FIG. 1A. In certain of those embodiments, chord height 50 is between about 45% and about 50% of the height of gap 20 in FIG. 1A. In certain embodiments, height 50 is about 47% of the height of gap 20 in FIG. 1A.

Coating layer 52 can be applied to thrust plate 28 with a minimum uniform thickness to introduce a flat contact surface 38A before wear-in. In certain embodiments of the example nominal 3.0 inch (76 mm) diameter butterfly valve discussed above, the initial applied thickness of coating layer 52 is between about 0.010 inches (about 250 µm) and about 0.030 inches (about 760 µm). In certain of those embodiments, this initial applied thickness is between about 0.015 inches (about 380 µm) and about 0.025 inches (about 630 µm). In yet certain of those embodiments, this initial applied thickness is about 0.020 inches (about 510 µm).

Wear-in can be part of the normal operation of a new or refurbished butterfly valve. The valve can be put into service immediately after assembly and wear-in will occur without additional processing steps with formation of seat 60 occurring gradually as the wear rate decreases asymptotically toward the "broken-in" wear rate realized at full plug diameter contact.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A butterfly valve comprising:
a housing including a bore for passage of a fluid;
a rotatable shaft passing through the bore, the shaft having a control end and a thrust reacting end;
a disc mounted to the shaft within the bore for controlling the flow of a fluid passing through the bore;
a thrust load reacting section including a thrust plug fixed to the thrust reacting shaft end and a thrust plate fixed to the housing, the thrust plate having a well for retaining the thrust plug and the thrust reacting shaft end; and
a wear interface with a first contact region on the thrust plug having a first contact surface and a second contact region at the base of the well having a second contact surface, the first and second contact regions in frictional contact at a first portion of the first contact surface and a second portion of a second contact surface;
wherein the first contact surface is substantially spherical;
wherein the first contact region includes tungsten carbide in a cobalt binder; and
wherein the second contact region includes a hardface coating layer including a plurality of chromium-containing particles in a nickel alloy matrix.

2. The butterfly valve of claim 1, further comprising:
a plug seat formed in the second contact surface;
wherein a thrust load and relative motion of the substantially spherical first contact surface causes wearing of a spherical recess in the second contact surface to form the seat.

3. The butterfly valve of claim 1, wherein the first spherical contact region of the thrust plug has a minimum Rockwell "A" hardness value of at least about 91.8.

4. The butterfly valve of claim 1, wherein the first contact region has a spherical chord height, the spherical chord height measuring between about 40% and about 55% of a height of a clearance gap between the disc and an inner surface of the bore.

5. The butterfly valve of claim 1, wherein the hardface coating has a minimum Rockwell "C" hardness value of at least about 50.

6. The butterfly valve of claim 1, wherein the hardface coating is applied to the thrust plate by brazing.

7. The butterfly valve of claim 1, wherein the plurality of chromium-containing particles in the nickel alloy matrix comprise a non-incidental quantity of chromium borides or a non-incidental quantity of chromium carbides.

8. The butterfly valve of claim 7, wherein the plurality of chromium-containing particles comprise both chromium borides and chromium carbides.

9. The butterfly valve of claim 1, wherein the hardface coating layer is diffused into a substrate.

10. The butterfly valve of claim 9, wherein the substrate is a surface at the base of the thrust plate well.

11. The butterfly valve of claim 1, wherein the cobalt binder forms between 5.0 wt % and 6.5 wt % of the total weight of the first spherical contact region.

12. The butterfly valve of claim 11, wherein the first spherical contact region comprises less than 0.5 wt % niobium.

13. The butterfly valve of claim 11, wherein the first spherical contact region comprises less than 0.5 wt % titanium.

14. The butterfly valve of claim 11, wherein the first spherical contact region comprises less than 2.2 wt % tantalum.

15. An engine nacelle comprising:
a bleed air inlet pipe; and
a pressure regulating and shutoff valve disposed in the bleed air inlet pipe, the pressure regulating and shutoff valve comprising:
a valve housing having a bore for passage of a fluid;
a rotatable shaft passing through the bore, the shaft having a control end and a thrust reacting end outside the bore;
a disc incorporated with the shaft inside the bore for controlling fluid flow; and
a wear interface including a thrust plug disposed at the thrust reacting shaft end and a thrust plate secured to the housing, the thrust plate having a well for retaining the thrust plug and the thrust reacting shaft end; and
wherein the thrust plug includes a first tungsten carbide contact region, and the base of the well includes a second wear-resistant contact region comprising a plurality of chromium-containing boride and carbide particles dispersed in a nickel alloy matrix, the nickel alloy matrix diffused into a base of the thrust plate well.

* * * * *